(12) United States Patent
Wallace et al.

(10) Patent No.: US 6,610,416 B2
(45) Date of Patent: Aug. 26, 2003

(54) MATERIAL TREATMENT FOR REDUCED CUTTING ENERGY AND IMPROVED TEMPERATURE CAPABILITY OF HONEYCOMB SEALS

(75) Inventors: Thomas Tracy Wallace, Maineville, OH (US); Brent Ross Tholke, Sycamore Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/842,576

(22) Filed: Apr. 26, 2001

(65) Prior Publication Data

US 2002/0158417 A1 Oct. 31, 2002

(51) Int. Cl.[7] .............................. B32B 3/12; C23C 16/00
(52) U.S. Cl. ...................... 428/593; 148/516; 148/527; 148/537; 415/173.4; 415/173.5; 415/174.4; 415/174.5; 427/248.1; 427/585; 427/592; 427/593; 427/252; 428/594; 428/637; 428/650; 428/652; 428/653; 428/678; 428/73; 428/116; 428/118; 428/689; 428/698; 428/908.8; 428/925; 428/926; 428/938; 428/941
(58) Field of Search .................................. 428/593, 594, 428/637, 650, 652, 653, 678, 73, 116, 118, 689, 698, 908.8, 925, 926, 938, 941; 148/516, 527, 537; 427/248.1, 585, 592, 593; 415/173.4, 173.5, 174.4, 174.5

(56) References Cited

U.S. PATENT DOCUMENTS

| | | | | |
|---|---|---|---|---|
| 4,060,250 A | * | 11/1977 | Davis et al. | 415/174.5 |
| 4,884,820 A | * | 12/1989 | Jackson et al. | 415/173.4 |
| 5,143,383 A | * | 9/1992 | Glynn et al. | 415/174.4 |
| 5,314,304 A | * | 5/1994 | Wiebe | 415/173.4 |
| 5,603,603 A | * | 2/1997 | Benoit et al. | 415/173.4 |
| 6,039,535 A | * | 3/2000 | Kobayashi et al. | 415/173.4 |

* cited by examiner

Primary Examiner—Robert R. Koehler
(74) Attorney, Agent, or Firm—Jonathan P. Miller; Carmen Santa Maria; McNees Wallace & Nurick LLC

(57) ABSTRACT

The present invention provides for a method to reduce the strength of the honeycomb of a jet turbine stator, increasing its machinability, with a resultant reduction in measured peak tooth temperature, while maintaining or even improving its high temperature capability, so as not to limit its operating environment. The air seal functionality is unaffected, and even improved in some instances. The machinability of the honeycomb is increased by using a light element diffused into the honeycomb ribbon to produce the effect of reducing its strength and ductility while maintaining the environmental resistance needed. The present invention also includes the stator honeycomb produced by the foregoing method.

27 Claims, 7 Drawing Sheets

COATING FOUND THROUGH OUT THE HONEYCOMB

MATERIAL TREATMENT FOR REDUCED CUTTING ENERGY AND IMPROVED TEMPERATURE CAPABILITY OF HONEYCOMB SEALS

The present invention relates generally to rotating labyrinth seals and particularly to rotating labyrinth seals having improved machinability for use in gas turbine engines for the propulsion of aircraft.

BACKGROUND OF THE INVENTION

Rotating labyrinth seals have a wide variety of uses and one such use is to effect sealing between plenums at different pressures in gas turbine engines. Such seals generally consist of two principal elements, i.e., a rotating seal and a static seal or shroud. The rotating seal, in cross section parallel to the axial length of the engine, frequently has rows of thin tooth-like projections extending radially from a relatively thicker base toward the static seal or shroud. The static seal or shroud is normally comprised of a thin honeycomb ribbon configuration for jet engine applications. These principal elements are generally situated circumferentially about the axial (lengthwise) dimension of the engine and are positioned with a small radial gap therebetween to permit assembly of the rotating and static components. The purpose of the labyrinth seal arrangement is to minimize gas path leakage out of the primary gas path and to segregate different stages of the compressor which are at different temperatures and pressures.

To a significant extent, engine efficiency depends upon minimizing this gas leakage around rotating components by controlling the gas flow to maximize interaction between the gas stream and the components in the primary gas path. The effectiveness of the turbine engine varies directly with the proportion of gas that impinges upon the blades of the rotating member. Closer tolerances between the rotating and static seals achieve greater efficiencies. The fabrication process to obtain these close tolerances is extremely costly and time-consuming.

When the gas turbine engine is operated, the elevated temperatures of operation cause the opposed static and rotating seals, such as those in the rotating labyrinth seals, to expand in a radial direction toward each other. The rotating labyrinth seals expand radially and rub into the shroud, creating frictional contact between the thin projections of the rotating seal and the shroud. During the rub, there is high thermal compression, with resultant high residual tensile stress after the rub. This frictional contact causes elevation of seal teeth temperatures in excess of 2,000 degrees F. with resulting possible damage to one or both seal members. For example, rotating tips may crack and break off, significantly impairing the seal efficiency and operation of the engine.

The thin, honeycomb ribbon construction of the shroud is used to reduce the surface area on which the seal teeth rub while reducing the weight of the structure, and helps to minimize the heat transferred into the rotating seal, while also providing the required strength. In addition, the rotating labyrinth seal teeth tips are made thin in order to thermally isolate them from the supporting base or shell structure. However, excessive heat from deep rubs (even into honeycomb) during engine start-up and during engine excursions can damage the rotating knife edge seals, negatively affecting durability and engine efficiency and providing a leak path for the flow of gases. Furthermore, material transfer can occur which also degrades the seal characteristics. Cutting into even low-density honeycomb cells can still cause rotary seal tooth damage, leading to premature part retirement.

Various coating techniques, for example, U.S. Pat. No. 5,314,304 to Wiebe, have been employed to coat the inside diameter of the stator shroud with an abradable coating in an attempt to increase both service life and operating efficiencies. The abradable coating can be worn away by the frictional contact of the rotating seal, thereby providing a close fitting channel in which the rotating seal may travel and maintaining efficiencies. One problem with an abradable coating system is that, over time, the abradable material filling the cells of honeycomb can separate from the substrate honeycomb as a result of thermal cycling. The abradable filler can then rub against the downstream blades causing engine vibrations. Other problems include inadequate sealing, seizing of cooperating members, elevation of the temperature of the rotor teeth as a result of the frictional wear induced by contact with the abradable coating and local "hot-spots" with resulting burning of non-abradable members.

Kobayashi et al. in U.S. Pat. No. 6,039,535 also addressed the problem of performance of the labyrinth seal for a centrifugal compressor. An abradable coating is applied over the casing. The improved seal is formed by bonding an additional layer of abradable material over the substrate material of the casing. The compressor clearances are set so that the tips of the rotating seal do not contact the substrate material casing, but rather only contact the abradable coating over the casing. The overall thickness of the casing and coating is increased to fill the gap between the substrate material casing and the rotating labyrinth seal. Kobayashi et al., however, does not disclose the use of a thin, ribbon like honeycomb material for a casing, and hence does not recognize the problems associated with forming a honeycomb material from thin ductile sheets and subsequently applying an abradable coating over the honeycomb material.

Other attempts at increasing engine efficiencies have included coating the seal teeth. For example, U.S. Pat. No. 5,603,603 to Benoit et al. is directed to applying an abrasive tip coating to the seal teeth, and U.S. Pat. No. 4,884,820 to Jackson et al. is directed to bonding a ceramic or metallic coating to the seal teeth.

Another approach addressing rotating seal tooth durability has been to make the seal teeth more defect tolerant, such that cracks that form due to rubbing are benign U.S. Pat. No. 5,143,383 to Glynn et al. relates to stepping the tooth profile to act as a crack arrestor. This method has a disadvantage of being dependent on a relatively low mean stress and stress range to avoid having crack growth of critical size during the expected life of the typical gas turbine part.

U.S. Pat. No. 4,060,250 to Davis et al. is directed to non-aircraft centrifugal compressors, in which the carbon steel rotary elements are inlaid or coated with a corrosion and heat resistant alloy, such as a chromium-containing nickel-based alloy, added to protect the underlying low carbon steel from ignition. The surface of the rotatable cylindrical member is characterized by this metallurgically fused alloy protective coating.

While much effort has been directed at improving the rotating structure of the seal arrangement, There is a continuous need for improved designs for rotating labyrinth seal structures including improvements directed to the static structure to increase both service life and engine operating efficiencies. The present invention fulfills this need, and further provides related advantages.

BRIEF SUMMARY OF THE INVENTION

The present invention provides for a method to increase the machinability of the honeycomb of the stationary portion of a labyrinth seal. The increased machinability of the stationary portion of the labyrinth seal, referred to as a shroud, results in a reduction in the measured peak tooth temperature of the rotating seal teeth of the rotating portion of the labyrinth seal, while maintaining or even improving the high temperature capability of the rotating labyrinth seal, so as not to limit its operating environment. The sealing functionality of the rotating labyrinth seal is unaffected, and even improved in some instances, by the method of the present invention. The improved machinability of the shroud results in less friction between the shroud and the rotating teeth, thereby reducing damage to the teeth.

After forming a honeycomb, which will be used as a seal or shroud, from a thin ribbon of ductile substrate material such as a superalloy material, the machinability of the honeycomb is increased by selecting a lightweight diffusible element that is capable of affecting the ductility of the substrate material by making it more frangible, that is to say, causing it to fracture into small particles in a machining event. The lightweight, diffusible element is diffused at a preselected, elevated temperature into the honeycomb ribbon substrate to cause a coating to be formed at or below the surface of the substrate. This coating causes the surface of the honeycomb to have mechanical properties that are different from the unaffected and underlying substrate portion of the honeycomb. The coating imparts improved machinability to that portion of the substrate into which it is grown, while also reducing the ductility of the substrate surface. The coating grown into the surface of the substrate has an effective, preselected depth that is thin. However, the thin coating is frangible, while the underlying substrate of the shroud remains ductile. Thus, the outer portion of the honeycomb seal having the thin coating has different machining characteristics than the underlying base material substrate of the shroud.

The present invention also includes the stator honeycomb shroud produced by the foregoing method of growing a diffusion coating into the substrate surface.

One advantage of the present invention is that the improved machinability of the honeycomb results in a reduced labyrinth rotor seal tooth temperature during the rub of the rotating labyrinth seal into the honeycomb shroud. Reduced temperature leads to reduced damage to the seal tooth, thus reducing the propensity to crack and hence propagate, and thereby increasing the service life.

Another advantage of the present invention is the reduced torque resistance. Because less torque is produced during the rub, simpler rotor designs may be produced, since they no longer require anti-rotation features. This is because friction alone on rabbets, which are radial contacts in a rotor assembly that maintain concentricity of the rotor, is adequate to maintain the rotating seal in position during rubs.

Still another advantage is the reduced metal transfer between honeycomb shroud and tooth tip, highly beneficial to maintaining seal clearances. The metal transfer is generally local in nature, causing a local high spot on the rotor which will then become the only place future rubs occur. This has the negative effect of leaving the remainder of the circumference with a larger gap as the local high spot on the rotor removes material substantially uniformly from the stator, resulting in greater engine inefficiencies. Less metal transfer results in a smaller gap and greater engine efficiencies.

Yet another advantage is that environmental resistance can be maintained or selectively improved for assuring that part life will not be shortened as a result of the improved machinability.

Another advantage is the reduction in the tendency of the rotating labyrinth seal to go out-of-round. Because rotating labyrinth seals are rarely manufactured perfectly concentric with the stator, local rubs are the norm. Out-of-roundness of the rotating seal results from local rubbing against the corresponding, adjacent shroud and subsequent sinusoidal thermal gradients which occur due to local rub. This out-of-roundness can result in deeper rubs into the shroud, resulting in even larger post-rub clearances. These deeper rubs can provide an increase in the amount of heat input into the teeth, resulting in damage or ultimate failure of the teeth. The decreased tooth heating of the present invention will reduce the tendency of the local rubs to cause deeper rubs and hence reduce the tendency of the seal to have larger post-rub clearances as the out-of-round conditions are minimized. Damage to the rotating seal teeth is also reduced.

Other features and advantages of the present invention will be apparent from the following more detailed description of the preferred embodiment, taken in conjunction with the accompanying figures which illustrate, by way of example, the principles of the invention.

DETAILED DESCRIPTION OF THE INVENTION

Figure 1:
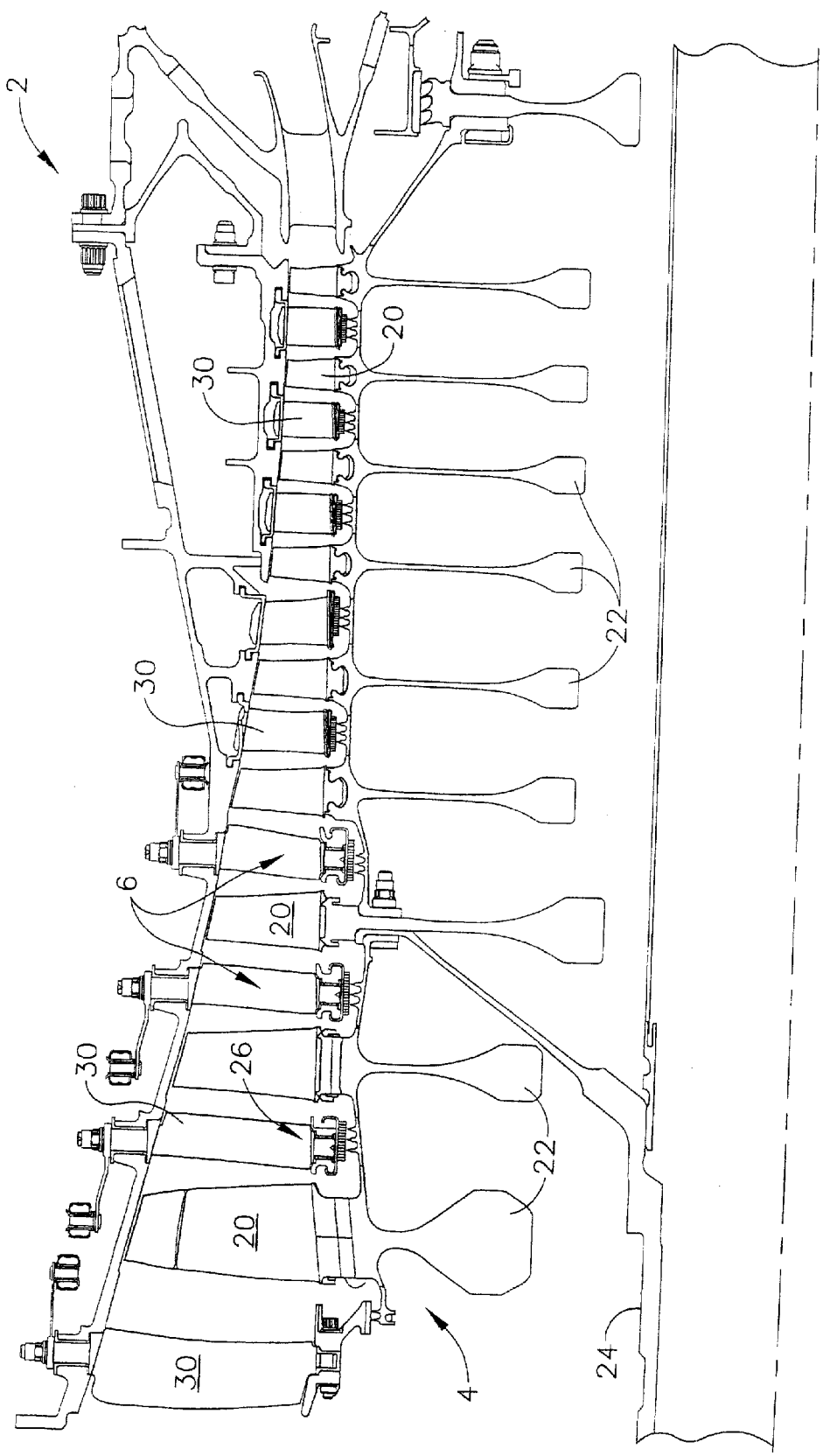
FIG. 1 is a representation of a jet turbine compressor rotor and stator.

Referring now to the Figures, where like parts have the same numbers, in accordance with a preferred embodiment of the invention, there is shown generally in FIG. 1 a segmented view of an axial flow compressor 2 of a typical jet engine having a compressor rotor 4 and stator 6. The compressor rotor of FIG. 1 is comprised of a series of compressor blades 20 assembled to compressor disks 22, with the compressor disks assembled to a common shaft 24. The rotating labyrinth seals of the present invention are not shown in FIG. 1, but are located on the compressor rotor at 26, between compressor disks 22. The stator 6, which is stationary, is comprised of a series of vanes 30 that axially direct the flow of air through the compressor as the rotating compressor blades 20 move and compress the air in an axial direction. The compressor blades 20 rotate between the compressor vanes 30 forming distinct stages of different pressures and temperatures. Associated with vanes 30, but positioned radially inward from the vanes, and opposite the rotating labyrinth seals of the compressor rotor 4 are shrouds made of thin, honeycomb ribbons. While the method of this invention is particularly adapted to the labyrinth seals, which are comprised of a rotating labyrinth seal positioned on the rotor 4 between disks 22 and a stationary seal or shroud along stators 6 comprised of thin honeycomb ribbon, the thin honeycomb ribbon having improved machinability and requiring reduced cutting energy while having improved temperature capability, other structures may be prepared using this method, if desired.

Figure 2:
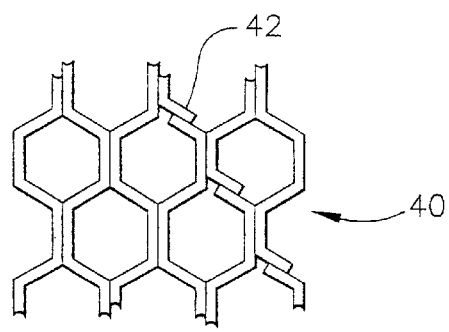
FIG. 2 is a representation of a partial section of a honeycomb shroud.

Shown in FIG. 2 is a section of the generally cylindrical stationary seal or shroud 40 which is positioned in the stator 6 and comprised of a honeycomb structure 42 that is generally cylindrical and typically bonded to a backing ring (not shown in FIG. 2). One method for forming the honeycomb structure is by corrugating, stacking and joining thin ductile sheets of material such as nickel or nickel base superalloys. Braze alloy compatible with the ductile material sheet is placed at attachment points between the honeycomb structure and the backing ring. For example, nickel that includes a melting depressant such as boron or silicon may be used as a braze alloy with a Ni base sheet such as HAST-X. On cooling, the sheets, previously attached to each other by a joining process such as tack welding, are to the backing ring at attachment points 44 by brazing.

Figure 4:
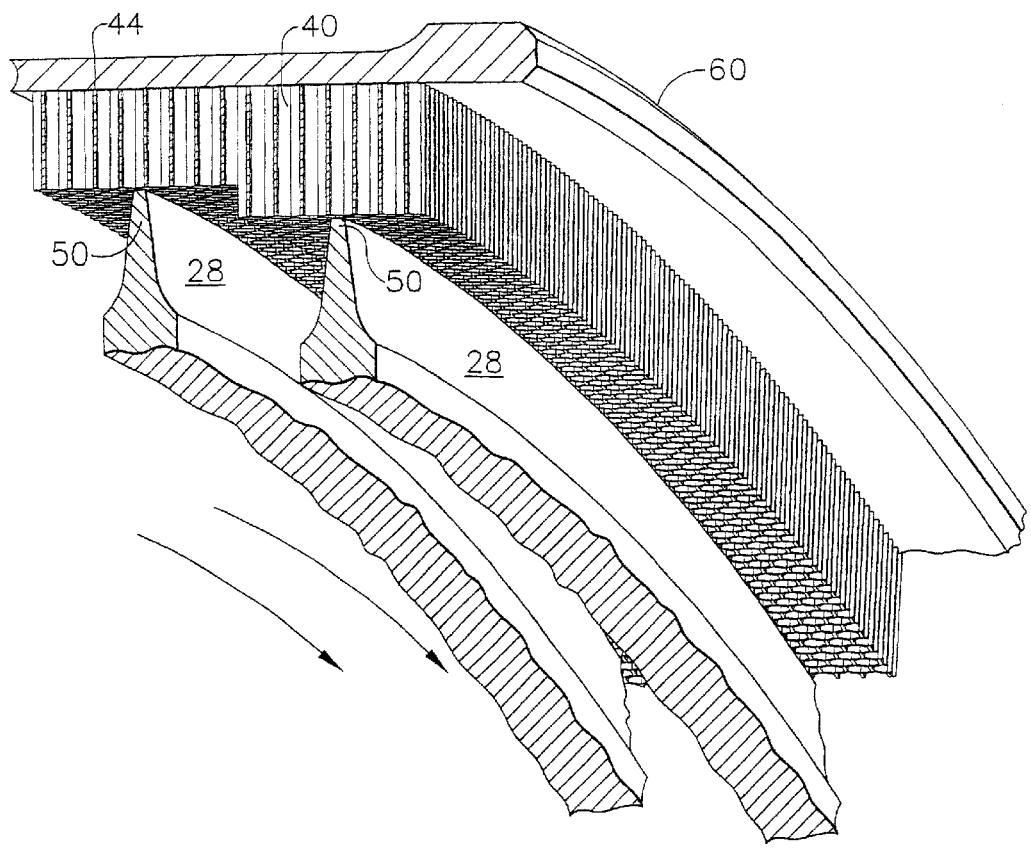
FIG. 4 is a perspective view of a stepped labyrinth seal arrangement showing the teeth of the labyrinth seal adjacent the honeycomb shroud.
Figure 3:
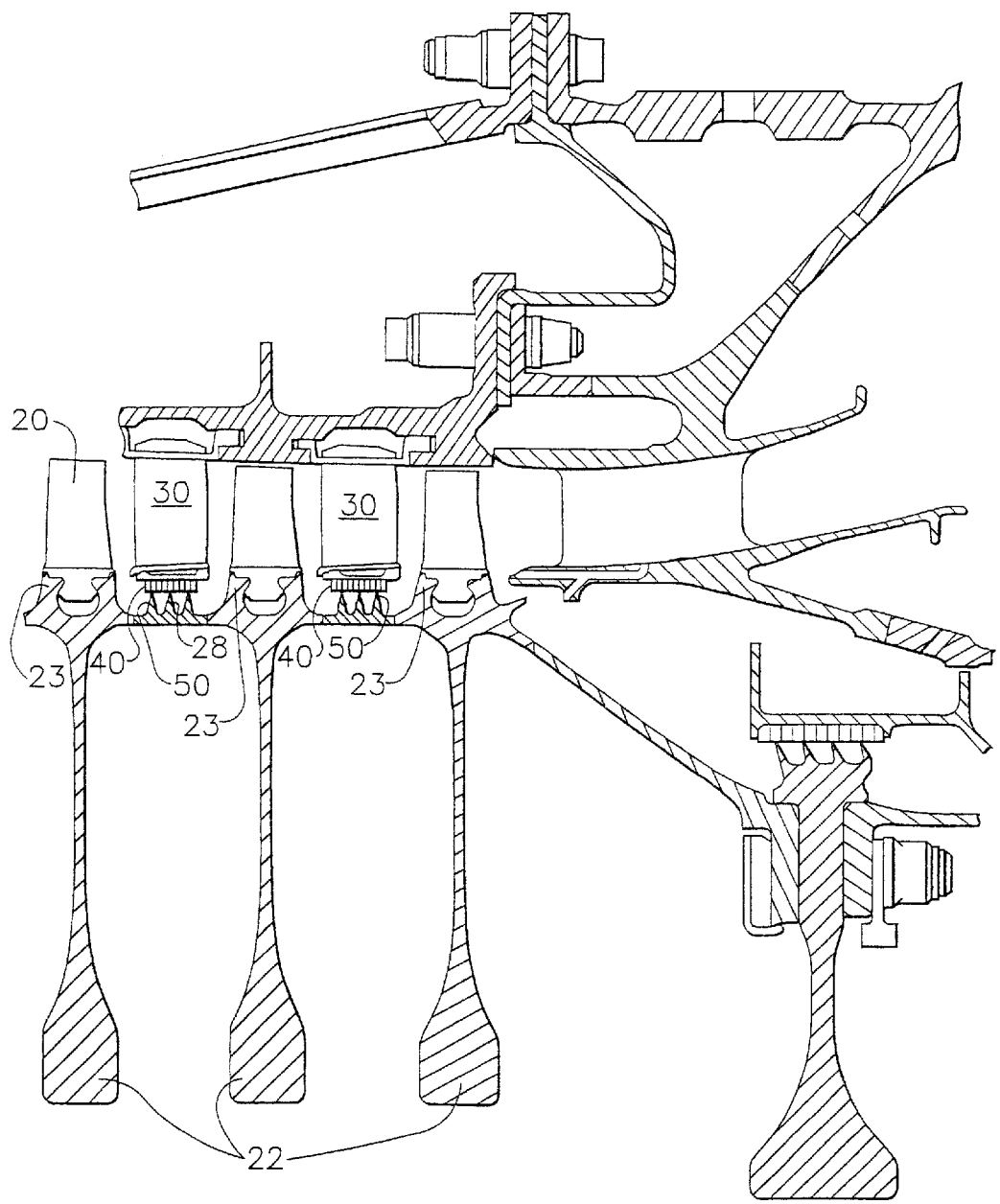
FIG. 3 is a cross-section of a compressor showing the labyrinth seal teeth adjacent the honeycomb shroud.

FIG. 3 is a cross-section of a compressor 2 that depicts honeycomb shrouds 40 assembled to compressor vanes 30. Adjacent to shrouds 40 are rotating labyrinth seals 28 positioned on the rotating portion of the compressor between compressor disks 22. The rotating labyrinth seals 28 each have at least one tooth 50 projecting in an outward radial direction toward the shrouds 40. Compressor blades 20 are shown assembled to the outer circumference 23 of compressor disks 22, and positioned in the gas flow path between vanes 30. As is evident from FIG. 3, the radial expansion of the rotating portion of the compressor during engine operation will cause the teeth 50 of the rotating labyrinth seals 28 to bear against the honeycomb of the shroud, causing material to be removed from the shroud. FIG. 4 is a perspective view of the teeth of a rotating labyrinth seal 28 bearing against a honeycomb shroud 40 joined to a backing strip 60 of a stepped labyrinth seal. Other engine structure has been removed for clarity. The direction of rotation of teeth 50 is perpendicular to a line drawn from a vane through the blade teeth, that is, perpendicular to the projection of the blade teeth, or into the plane of the figure substantially in the direction of the arrows. As can be seen, it is desirable for the material from shroud 40 to be removed as a small frangible particle rather than by melting, which requires more energy for removal, thereby heating teeth 50.

While the foregoing applications refer to the labyrinth seal used in the compressor portion of the gas turbine engine, it will be understood that a similar mechanical design for a labyrinth seal arrangement is used in the turbine or hot portion of the gas turbine engine to separate and isolate the various stages of the turbine sections from one another. The materials used in the hot section are different, utilizing nickel-base superalloys rather than titanium-base alloys, as the nickel-base superalloys have been adapted to survive at the high temperatures and severe environments of the turbine section of the engine.

The method of this invention is performed by exposing the ductile material forming the honeycomb, for example, ribbon material, to a light element such as aluminum, nitrogen, hydrogen or boron at high temperatures to allow the light element to diffuse into the surface of the honeycomb and alter the surface characteristics of the honeycomb by forming a brittle phase that can be more easily machined. For example, it is known that aluminide coatings such as titanium aluminide (TiAl) and nickel aluminide (NiAl) can have brittle characteristics in a range of temperatures below the Ductile-Brittle Transition Temperature (DBTT), and that a boronized surface can reduce the ductility of high-strength nickel based sheet metal by embrittling it. Although boron is a light element which can diffuse away quickly in hot sections of the turbine engine in which the temperatures in the region of the seal or shroud can approach 1800° F., it can be utilized in the cold sections of the engine such as the compressor or in non-flow path areas of the turbine where the maximum temperatures reached are generally in a range below about 1300° F. (about 700° C.). At these operating temperatures, further diffusion of aluminum or even a light element such as boron is minimal, and the diffusion coating will not continue to grow into the substrate base material. Thus, it is possible to grow a diffusion coating into a thin substrate to provide a thin, frangible surface layer while maintaining a ductile base material underlying the thin surface layer. In higher temperature applications, such as combustor regions and turbine sections, braze alloys for the honeycomb can have solidus temperatures above about 1900° F. In a preferred embodiment for high temperature applications, the coating is applied to the honeycomb at a temperature lower than the lowest solidus temperature braze alloy used in the assembly of the part or component, typically lower by about 25–50° F. As an example, a low pressure turbine vane uses a braze alloy with a solidus temperature of about 2100° F. The honeycomb was coated in accordance with the present invention at a temperature in the range of about 1925–1975° F. for about 2–6 hours.

The thickness of the honeycomb ribbon substrate forming the shroud is generally from about 0.001 inch to about 0.005 inch, typically about 0.003 inch. Honeycomb cell width is typically about 1/16" (0.063"), 1/32" (0.032") or 1/8 inch (0.125"). The honeycomb cell height is between about 1/4" (0.25") to about 1/2" (0.5").

While the depth of the rub may be as great as 0.090 inch, rub depth is typically about 0.015 inch to about 0.020 inch for 360° of travel, with about 0.060 inch depth considered severe.

The coating may be applied by a vapor phase deposition process, by a pack-process, by an activated aluminum-containing tape, referred to as CODAL tape, or by slurry, typically after the honeycomb material has been formed. The coating is then diffused into the base material forming the honeycomb. The regions of attachment of the honeycomb to the backing plate may be masked, if desired to protect these regions from exposure to the lightweight elements in order to facilitate brazing. After the coating is applied by exposing the substrate base material sheet to the light weight element promoting the formation of the diffusion coating at elevated temperature, the masking material is removed so that brazing of the honeycomb to the backplate can be accomplished in a conventional manner. It is also possible to apply the coating after brazing the honeycomb to the backing structure. By exposing the honeycomb seal to the diffusible element at an elevated temperature, the easily diffusible element is diffused into the substrate material to an effective depth to form a frangible coating extending to the effective depth overlying the ductile substrate, while maintaining the effective environmental resistance of the honeycomb seal.

As previously noted, the coating may be formed by any of several methods. One method for forming an aluminide coating is vapor phase aluminiding (VPA) which can be accomplished by a pack process or by an over the pack process. In a pack process, the substrate is placed into a powder that includes aluminum as well as inert powder. However, other lightweight powders may be substituted for aluminum to achieve a different type of frangible coating. In one form, the powder can be packed into the cells of the honeycomb prior to heating. The brazed areas may be masked, if desired, to minimize the exposure of these areas to the lightweight element such as aluminum. In another form, the substrate sheets may be packed into the powder with appropriate masking prior to forming the honeycomb structure as previously discussed. An activator is also included in the powder to enhance the exposure of the substrate to the lightweight element. The packed substrate is heated to a predetermined elevated temperature for a preselected time to allow the light weight element to diffuse into the substrate a predetermined distance forming a coating having a thickness corresponding to the predetermined distance. The depth of diffusion of the element into the substrate is determined by the temperature of exposure and time at temperature. Another VPA method for growing a diffusion coating into the substrate is by an over-the-pack process. The mechanism of formation of the diffusion coating by growth into the substrate is similar in the over-the-pack process to the pack process. The major difference in the over-the-pack process is that the substrate is suspended over the powders rather than being in direct physical contact with the powders. The gaseous lightweight elements form a gas phase on heating which flows over the suspended substrate. The lightweight elements flow over and are deposited onto the substrate surface and subsequently diffuse into the substrate surface.

The pack-powder process, when powder is packed into the honeycomb cell, produces a more uniform coating thickness from the top of the honeycomb cell to the base of the honeycomb cell adjacent the backing plate, whereas over-the-pack processing produces a gradient of coating thickness which decreases in the direction from the top of the cell to the backing plate. Thus, a substrate in which the coating is formed by diffusing the light weight element by using a pack will have a substantially uniform amount of this element distributed along the honeycomb wall, hence resulting in a coating of substantially uniform thickness, so that the amount of the brittle, frangible phase will be located in the structure uniformly throughout the honeycomb cell. Thus, the honeycomb cell is characterized by the same uniform frangibility, regardless of the depth of the rub by the rotating labyrinth seal into the honeycomb cell. For a coating produced by an over-the-pack process, the amount of the coating resulting from diffusion of the lightweight element is greater at the honeycomb surface opposite the backing plate, and diminishes as the backing plate is approached. Physically, this results in the formation of a greater quantity of the brittle, frangible phase at the surface of the honeycomb opposite the backing plate and closer to the labyrinth seal. The amount of this frangible phase decreases with increasing depth into the honeycomb cell toward the backing plate. In this circumstance, the mechanical behavior of the substrate will change with increasing incursion of the rotating labyrinth seal into the honeycomb substrate. For a nickel base alloy that has been aluminided for sufficient time so that a NiAl phase predominates at or near the surface of the substrate, the mechanical behavior of the substrate at the surface will be controlled by the predominant NiAl phase, so that it will be very frangible. Upon contact with the rotating labyrinth seal, the predominant NiAl phase will cause the surface to form very small powder-like particles as it is worn into. Of course, as the incursion into the honeycomb structure increases and the coating thickness decreases, the predominance of the NiAl phase will decrease until the nickel base alloy predominates. Thus, with increasing depth into the surface, the particles will become larger and less powder-like and the material will become more ductile, so that deformation changes from substantially brittle to substantially ductile.

Another method for forming a coating is by application of a tape containing the lightweight, diffusible element, an activator and an adhesive. The adherable tape that includes the diffusible element and an activator is adhered to the substrate that is to be coated. For example, an aluminide coating may be formed by use of CODAL tape, which includes aluminum and an aluminum activator. A typical CODAL tape is about 0.050" in thickness and is adhered directly to the surface that is to be exposed to the elemental aluminum. Tape processes such as CODAL tape provides for more accurate control of the coating method, as the diffusion coatings, diffusion aluminide coatings for CODAL tape, are grown into the substrate below the tape. Thus, areas to which the tape is not applied do not experience measurable amounts of the diffusion coating. Thus, areas which are desired to be free of the diffusion coating, such as areas in which braze alloy is or will be present, may not require masking. When CODAL tape is used, an aluminide diffusion coating is achieved when the aluminum source powder provided in the tape layer by combining the powder and an activator with a binder that decomposes substantially without residue upon heating to the predetermined temperature for the preselected time to achieve the desired depth of coating.

Another method for growing a coating of the present invention into the surface of a substrate is by application of a slurry. The slurry is a viscous combination of an evaporable carrier fluid such as deionized water, the lightweight element, for example aluminum, a binder such as clay and an activator. It is applied directly to the surface of the substrate. As the carrier fluid quickly evaporates, the binder adheres the aluminum and activator to the surface of the part which is to have the diffusion aluminide coating formed by growth. After application of the slurry and evaporation of the carrier fluid, the coating is grown into the substrate in the usual manner by heating to a predetermined temperature for a preselected time. The slurry method is similar to the tape method in that the diffusion layer is only grown into the substrate in locations where the slurry is applied directly to the substrate. Other substrate areas are unaffected. The slurry method is preferred over the tape method as the slurry is easier to apply.

The preferred coating thickness is functional by percentage of ribbon thickness and the amount of cutting energy desired to be reduced, with a minimum coating of about 0.00005". Typically, for a ribbon having a thickness of about 1.2 mils, the coating thickness is about 0.2–0.3 mil on either side of the ribbon. In one embodiment, a first side of the thin ribbon and a second side of the thin ribbon are exposed to the diffusion element so that a frangible coating is formed to about equal depths on the first side of the thin ribbon and the second side of the thin ribbon and the effective depth of diffusion of the lightweight element is about the same on the first ribbon side and on the second ribbon side, as expected from Fick's Law of Diffusion. While even a very small amount of diffusion depth of the light weight element into the substrate reduces cutting strength, the coating thickness is preferably between about 25 percent to about 75 percent of substrate ribbon thickness, most preferably, about 50 percent of substrate ribbon thickness, with, ideally, 25 percent of the depth occurring on each side of the substrate ribbon.

Aluminum is the preferred deposition material and vapor phase deposition (VPA) is another effective means of delivering the aluminum in order to more uniformly distribute the coating into the honeycomb cells. As diffusion is both time and temperature dependent, these variables can be controlled to achieve the desired diffusion depth. Control of diffusion depth is necessary to achieve an optimal balance of honeycomb ribbon toughness so as not to over embrittle the ribbon, with the resultant potential for handling damage, yet simultaneously make the material more machinable. While diffusion is both time and temperature dependent, because the depth of diffusion into the substrate ribbon is small and must be accurately controlled, it is preferred to control the process by using longer times and slightly lower temperatures than would be used in other applications, such as application of environmental diffusion coatings. Low temperature diffusion is also required in situations in which the diffusion coating is applied after brazing the honeycomb to the backing structure to avoid reflow of the brazing material.

While the slurry and tape methods have been effective in forming a diffusion coating only in areas of contact with the slurry and tape, VPA should be applied either prior to formation of the honeycomb using masking materials or after honeycomb formation. Because the diffusion coating may inhibit brazing flow, masking preferably is used to prevent deposition of a coating in those regions in which brazing is required prior to use of VPA to form the coating. Other methods may be utilized to remove the diffusion coating after a VPA treatment prior to formation of the honeycomb and can be utilized, but such methods are not preferred as these methods require at least localized material removal in those areas in which brazing is accomplished.

It is preferable to form the coating on the honeycomb base material, most preferably by a slurry after honeycomb formation and brazing of the honeycomb to the back plate. Temperature and time are key factors in achieving diffusion, and the coatings can be formed by any of the above processes in a temperature range of from 1600° F. to 2100° F. for times of 0.5 to 6 hours. The diffusion process is governed by Fick's Second Law, whose solution yields $x^2=D*t$ where x is the mean penetration distance of the element, t is the elapsed time for diffusion and D is the diffusion coefficient of the element and is exponentially related to temperature by the formula $D=D_0 e^{-Q/kT}$. Diffusion coefficients at various temperatures are available for common elements such as aluminum and boron. As previously noted, the lower temperatures and longer times are preferred for the thin honeycomb ribbon used for shrouds. In one embodiment, the vapor phase deposition process is performed a the elevated temperature in the range of about 1750° F.–1825° F. for a time of about 4 to about 6 hours. The preferred coating process is performed at about 1750° F. to about 1775° F. for about 4 to about 6 hours. This temperature will achieve the diffusion to the preselected depth by producing a frangible surface region with an underlying ductile substrate, yet not disbond or distort the honeycomb material, while remaining below the solidus temperature of the braze alloy, typically about 1800° F., used to bond the honeycomb to its backing ring.

The following example demonstrates the reduction in rub energy per unit volume of honeycomb removed, with resultant decrease in average and peak temperatures.

EXAMPLE 1

Samples of 1/16 cell, 1.2 mil ribbon HASTALLOY® X, a well known superalloy trademarked by Haynes International, Inc. of Kokomo, Ind. comprising about 22 weight percent chromium, about 18 weight percent iron, about 9 weight percent molybdenum, about 1.5 weight percent cobalt, about 1.5 weight percent tungsten, at most about 1 weight percent manganese, at most about 1 weight percent silicon, and at most about 0.008 weight percent boron, with the balance being nickel, honeycomb with simulated backing were coated with an aluminide coating utilizing a vapor phase deposition process and qualitatively tested for resulting tensile strength. The honeycomb material was attached to the backing plate utilizing AMS 4777 braze alloy having a solidus temperature in the range of 1900–2000° F.

Figure 5:
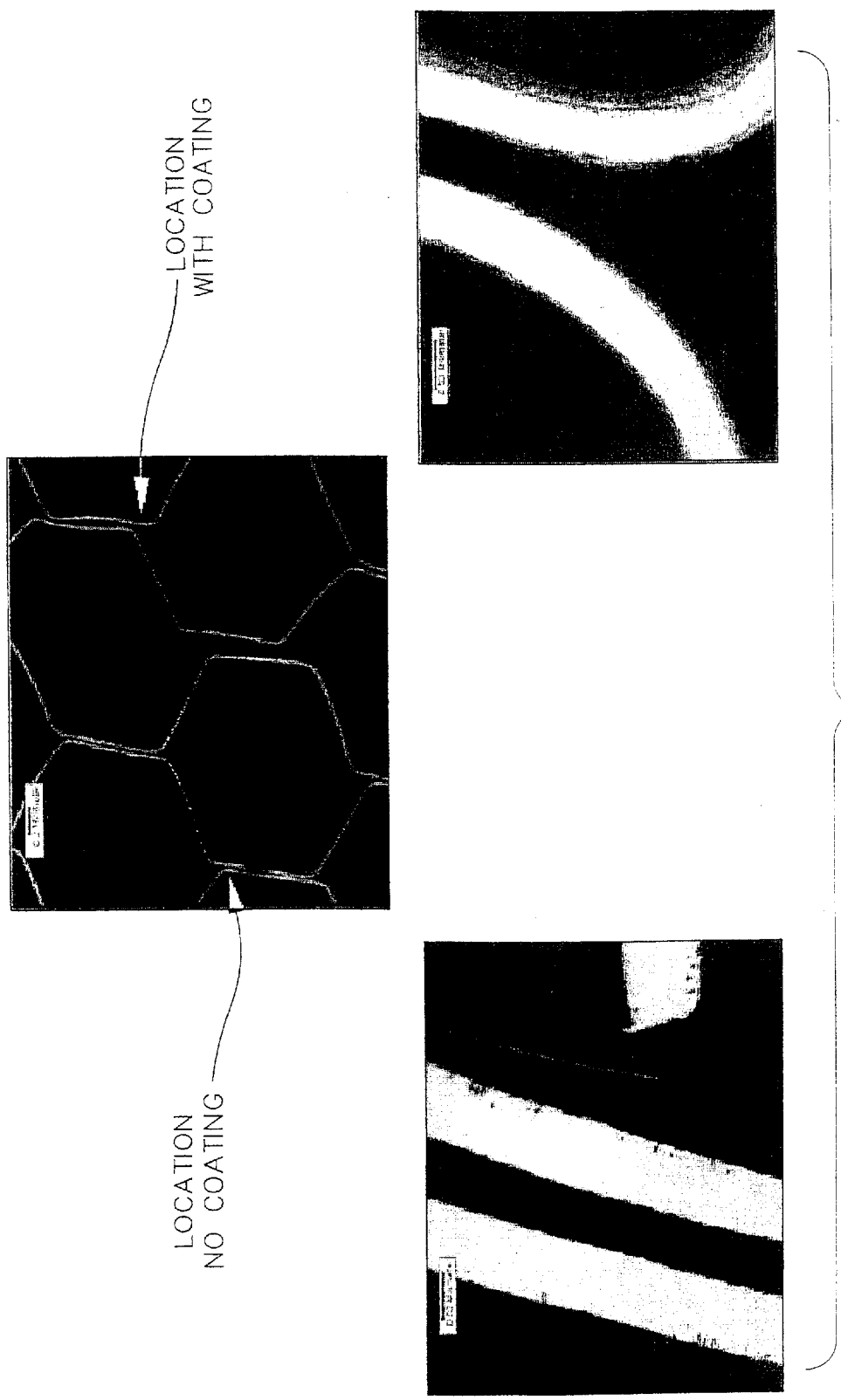
FIG. 5 is a photomicrograph of the coating produced by vapor phase deposition at 1750° F. at four hours.

One sample was exposed to a vapor phase aluminide deposition at 1750° F. for four hours, and a second sample was exposed at 1775° F. for six hours. The sample exposed at 1750° F. for four hours was easier to tear using simple hand manipulation than uncoated material indicating reduced shear strength, but still remained quite strong. As seen in FIG. 5, a photomicrograph taken after diffusion aluminiding at 1750° F. for four hours, diffusion did occur; however, the diffusion coating was judged to be incomplete. There was little or no elemental material addition of aluminum in the ribbon thickness, measured at about 1.2 mils.

Figure 6:
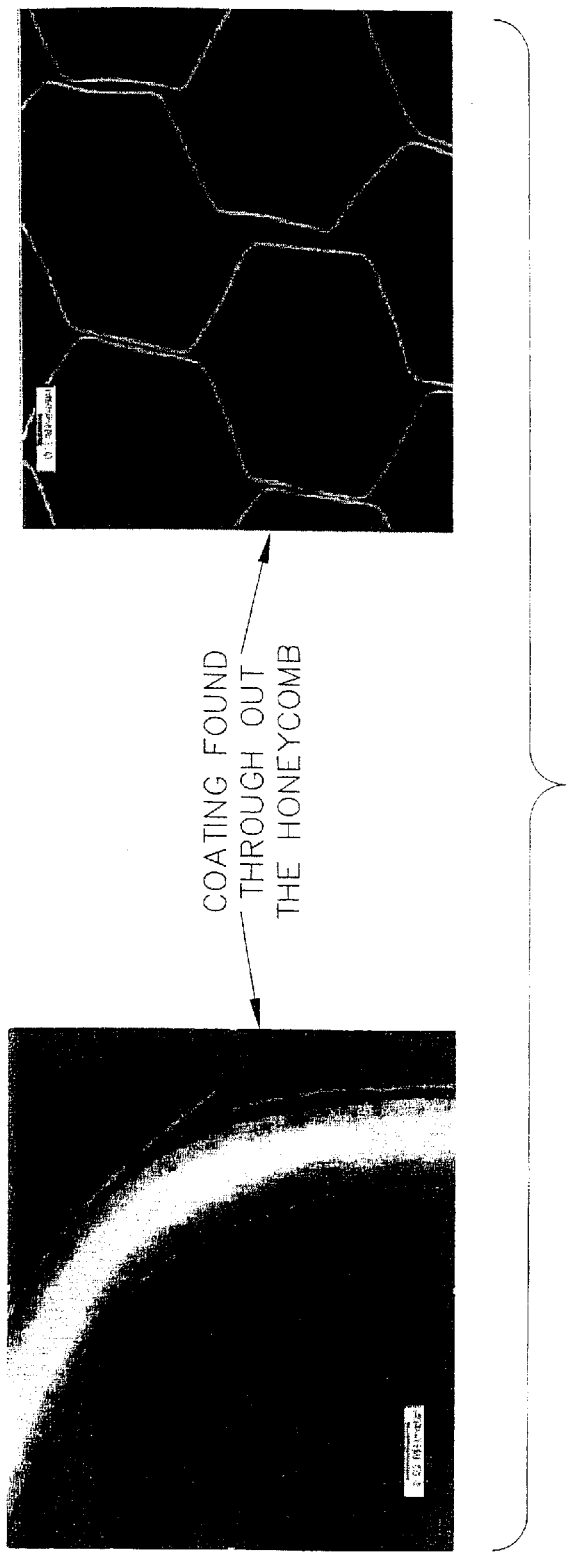
FIG. 6 is a photomicrograph of the coating produced by vapor phase deposition at 1775° F. at six hours.

The second sample exposed at 1775° F. for six hours was even easier to tear using simple hand manipulation than the first sample, indicating a lower shear strength than the first sample. The photomicrograph of FIG. 6 indicates that at an exposure at 1775° F. for six hours that sufficient aluminum had diffused into the surface of the honeycomb to form an aluminide coating at and near the surface of the substrate. The ribbon thickness of the substrate measured at about 1.3 mils, indicating that some aluminum had diffused into the substrate and combined with the HASTALLOY® X alloy, causing at least a partial transformation to a brittle NiAl-type phase within the substrate matrix. The sample exposed at 1775° F. for six hours was considered best suited for a rub test because of the presence of the brittle phase.

Baseline sample drums with honeycomb already brazed in (rub drums) were prepared using HASTALLOY® X 1/32" cell, 1.2 mil foil; HASTALLOY® X 1/16 cell 1.2 mil foil; and HAYNES® 214™, a well known superalloy trademarked by Haynes International, Inc. of Kokomo, Ind. comprising about 16 weight percent chromium, about 3 weight percent iron, about 4.5 percent aluminum, about 0.05 weight percent cobalt, about 0.01 weight percent yttrium, at most about 0.5 weight percent manganese, at most about 0.2 weight percent silicon, at most about 0.1 weight percent zirconium, and at most about 0.01 weight percent boron, with the balance being nickel 1/8" cell, 5 mil foil. A test rub drum of HASTALLOY200 X 1/16" cell 1.2 mil foil was exposed to a VPA process at 1775° F. for six hours, subjected to a rub test using a rotating rig, and the results compared to a baseline rub test of drums without a difussion coating.

Figure 7:
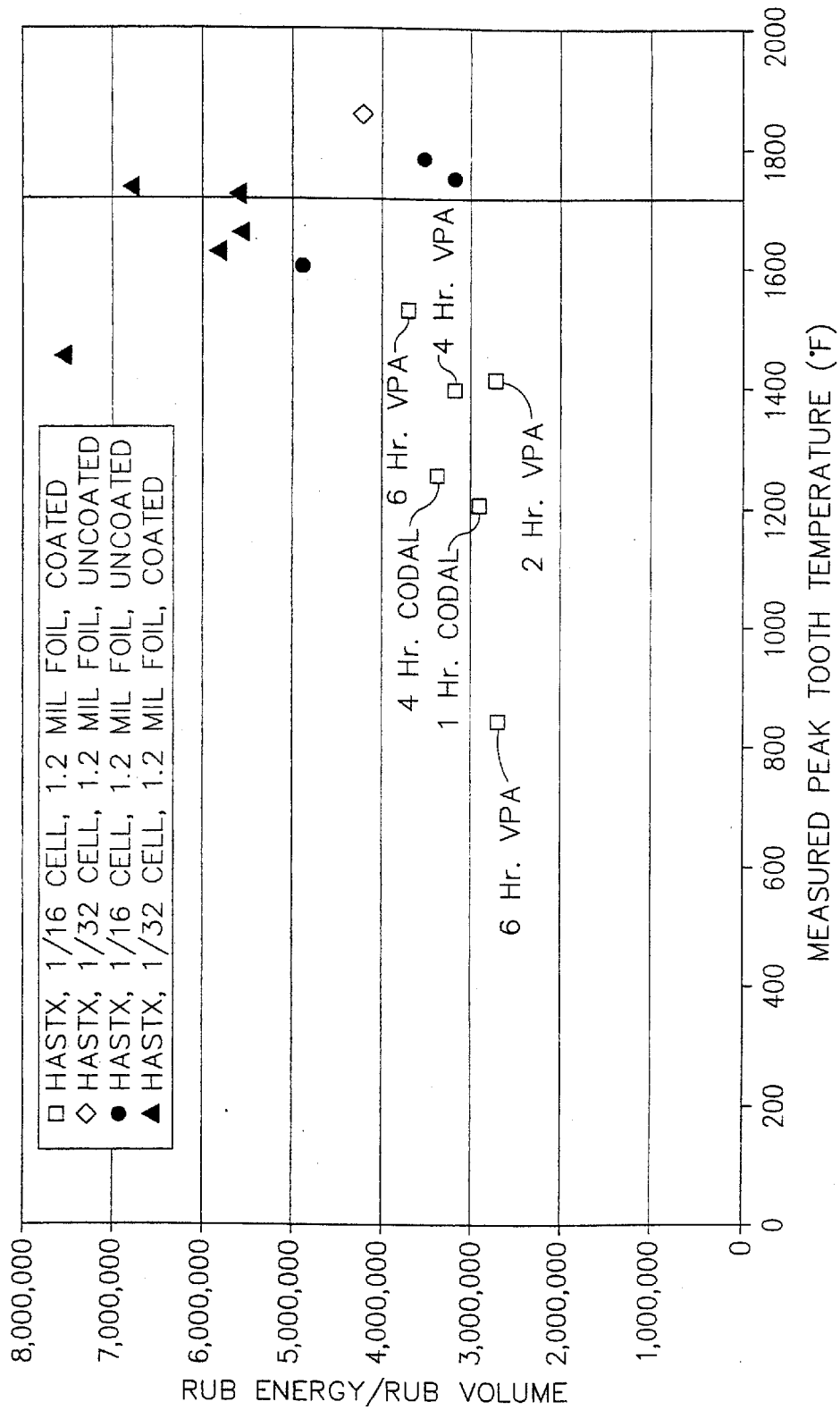
FIG. 7 is a graph displaying Measured Peak Tooth Temperatures at varying Rub Energy/Rub Volume.
Figure 8:
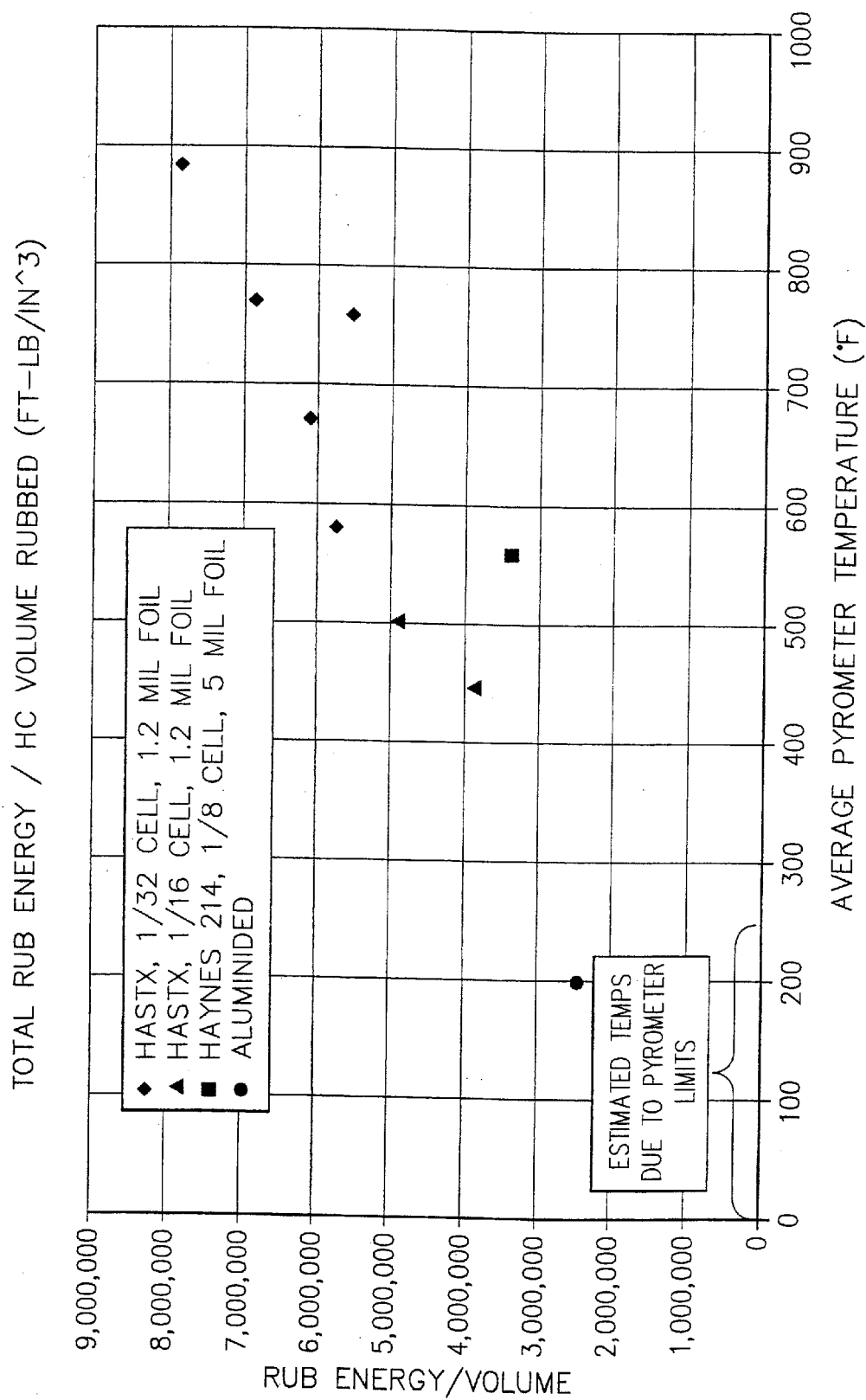
FIG. 8 is a graph displaying Average Pyrometer Temperature at varying Rub Energy/Volume.

As can be seen in the graphs of FIGS. 7 and 8, the VPA treated samples had a reduction in peak tooth temperature and heat affected zone (HAZ) temperature in excess of 800° F. in certain applications as compared to untreated samples. Although a greater reduction in peak tooth temperature was found for the 1/16 inch cells, on average about 500° F., than for the smaller 1/32 inch cells, there was a still a substantial, although smaller, average temperature reduction for the 1/32 inch cells of about 300° F.

The reduction or elimination of the heat affected zone as a result of applying a frangible coating to a stationary portion of a labyrinth seal or shroud by the method of the present invention will significantly reduce the number of cracked seal events during engine operation and will improve engine operation and efficiency. While the reduced cutting energy produced by the present invention is beneficial for use in both the hot and cold sections of the turbine engine, the beneficial effects of a diffusion aluminide coating in providing environmental protection to the shroud in the hot engine section is yet another added benefit.

Furthermore, the method of the present invention is applicable to virtually all metallic honeycomb seals, allows for diffusion coating of completed compressor and turbine assemblies, thereby reducing production costs and improves the environmental durability of the seals, which is of particular benefit for honeycomb seals used in the hot turbine portion of the gas turbine engine. The present invention additionally provides the ability to apply or selectively re-coat or diffuse light elements such as boron or aluminum to areas that have been cut during engine service, further reducing overall engine service life costs by increasing the replacement interval or the shroud or seal assembly. Furthermore, the honeycomb seals of the present invention provide a benefit to the mating rotor seals. By providing honeycomb seal that reduces the wear on the mating rotor seal teeth, the life of the rotor seals will be increased, thereby increasing the interval between seal teeth refurbishment. The current practice of stripping and recoating seal teeth whenever the matching stator is replaced may not be needed with the present invention.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A method for producing a honeycomb seal having reducing cutting energy and improving the temperature capability for use in a turbine engine, comprising the steps of:
    forming a honeycomb seal from a thin ribbon of ductile substrate material;
    selecting an easily diffusible element capable of affecting the ductility of the substrate material;
    exposing the honeycomb seal to the diffusible element at an elevated temperature, thereby diffusing the easily diffusible element into the substrate material to an effective depth to form a frangible coating extending to the effective depth overlying the ductile substrate, while maintaining the effective environmental resistance of the honeycomb seal.

2. The method of claim 1 wherein the step of selecting an easily diffusible element includes selecting an element from the group consisting of aluminum, nitrogen, hydrogen and boron.

3. The method of claim 1 wherein the step of exposing the honeycomb seal to the diffusible element includes applying the diffusible element to the honeycomb seal using a vapor phase deposition process.

4. The method of claim 1 wherein the step of exposing the honeycomb seal to the diffusible element at an elevated temperature includes an elevated temperature below a temperature for brazing the honeycomb seal to a backing plate.

5. The method of claim 3 wherein the vapor phase deposition process is performed at the elevated temperature in the range of about 1750° F.–1825° F. for a time of about 4 to about 6 hours.

6. The method of claim 5 wherein the vapor phase deposition process is performed at the elevated temperature of 1775° F. for about 6 hours.

7. The method of claim 3 wherein the vapor deposition process is performed at the elevated temperature in the range of about 1925° F.–1975° F. for a time of about 2 to about 6 hours.

8. The method of claim 1 wherein the step of exposing the honeycomb seal to the diffusible element includes applying the diffusible element to the honeycomb seal using a pack process.

9. The method of claim 1 wherein the step of exposing the honeycomb seal to the diffusible element includes applying the diffusible element to the honeycomb seal using an adherable tape having the diffusible element.

10. The method of claim 1 wherein step of exposing the honeycomb seal to the diffusible element includes diffusing the element to a depth of about 25 percent to about 75 percent of substrate material thickness.

11. The method of claim 1 wherein step of exposing the honeycomb seal to the diffusible element includes diffusing the element to a depth of about 50 percent of ribbon thickness.

12. The method of claim 1 wherein step of exposing the honeycomb seal to the diffusible element includes exposing a first side of the thin ribbon and a second side of the thin ribbon to the diffusion element so that a frangible coating is formed to about equal depths on the first side of the thin ribbon and on the second side of the thin ribbon.

13. The method of claim 2 wherein the diffusible element is diffused into the substrate material to a depth of at least about 0.00005".

14. A honeycomb seal having reducing cutting energy and improving the temperature capability for use in a turbine engine, produced by the steps of:
    forming a honeycomb seal from a thin ribbon of ductile substrate material;
    selecting an easily diffusible element capable of affecting the ductility of the substrate material; and
    exposing the honeycomb seal to the diffusible element at an elevated temperature, thereby diffusing the easily diffusible element into the substrate material to an effective depth to form a frangible coating extending to the effective depth overlying the ductile substrate, while maintaining the effective environmental resistance of the honeycomb seal.

15. A ribbon material for use as a stationary portion of a labyrinth seal used in a turbine engine, the material comprising:
    a thin strip of ductile superalloy material of preselected thickness selected from the group consisting of nickel, cobalt, and iron based superalloys; and,
    a frangible coating formed by diffusing a lightweight diffusible element into the ductile superalloy material to an effective depth, thereby reducing the cutting energy required when removing material from the ribbon material.

16. The ribbon material of claim 15 wherein the lightweight, diffusible element is selected from the group consisting of aluminum, hydrogen and boron.

17. The ribbon material of claim 15 wherein the coating is formed by diffusing the lightweight, diffusible element using a vapor phase deposition process.

18. The ribbon material of claim 17 wherein the vapor phase deposition process is performed at about 1750° F. to about 1825° F. for about 4 to about 6 hours.

19. The ribbon material of claim 18 wherein the vapor phase deposition process is performed at about 1775° F. for about 6 hours.

20. The ribbon material of claim 15 wherein the coating is formed by diffusing the lightweight, diffusible element using a pack process.

21. The ribbon material of claim 15 wherein the coating is formed by diffusing the lightweight, diffusible element using an adherable tape that includes the diffusible element.

22. The ribbon material of claim 15 wherein the coating is formed by diffusing the lightweight, diffusible element to a depth of about 25 percent to about 75 percent of a thickness of the ribbon material.

23. The ribbon material of claim 15 wherein the coating is formed by diffusing the lightweight diffusible element to the effective depth of about 50 percent of a thickness of the ribbon material.

24. The ribbon material of claim 15 wherein the thin strip of superalloy material is further comprised of a first side and an opposed second side, wherein the effective depth of diffusion of the lightweight element is the about the same on the first ribbon side and on the second ribbon side.

25. The ribbon material of claim 15 wherein the frangible coating is formed by diffusing the lightweight, diffusible element to a depth of at least about 0.00005" into a surface of the superalloy material.

26. The ribbon material of claim 15 wherein the thin strip of ductile, superalloy material is a honeycomb comprised of a superalloy material.

27. The ribbon material of claim 26 wherein the thickness of the honeycomb comprised of superalloy material is about 0.001 inch to about 0.005 inch, and each cell in the honeycomb has a width of about 1/32" to about 1/8".

* * * * *